P. KEYMER.
KEEL BLOCK.
APPLICATION FILED SEPT. 3, 1907.

965,302.

Patented July 26, 1910.

2 SHEETS—SHEET 1.

Witnesses
E. B. Gilchrist
H. P. Sullivan

Inventor
Philip Keymer
by
Thurston Woodward
Attys

P. KEYMER.
KEEL BLOCK.
APPLICATION FILED SEPT. 3, 1907.
965,302.
Patented July 26, 1910.
2 SHEETS—SHEET 2.
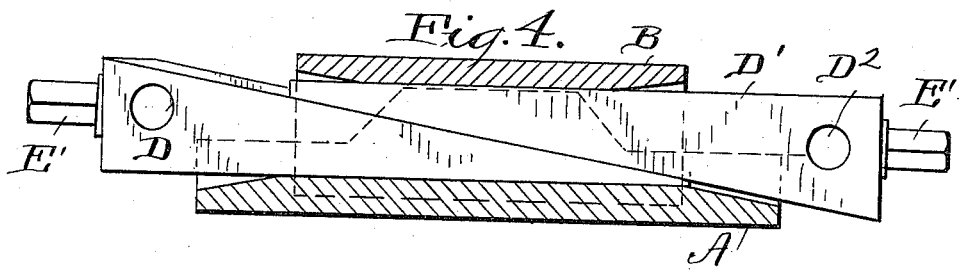
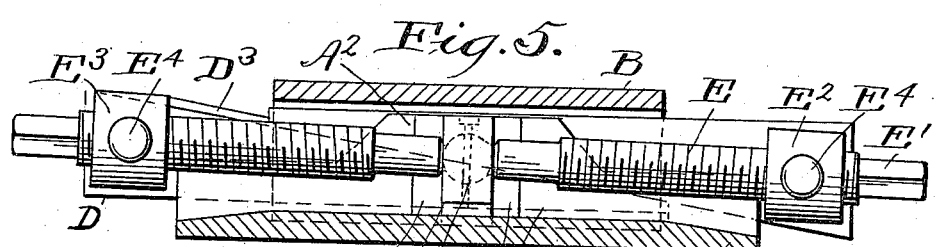
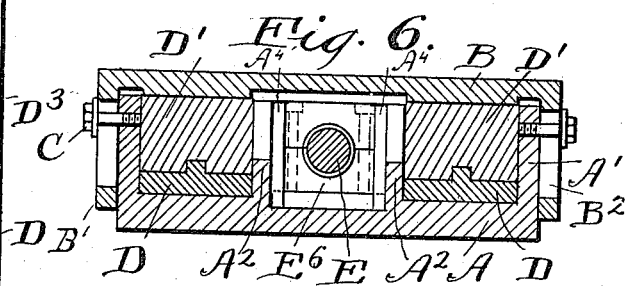
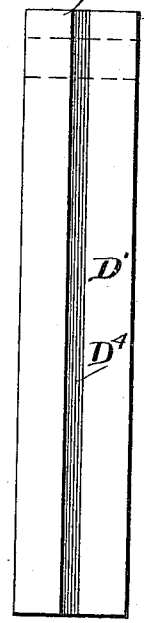
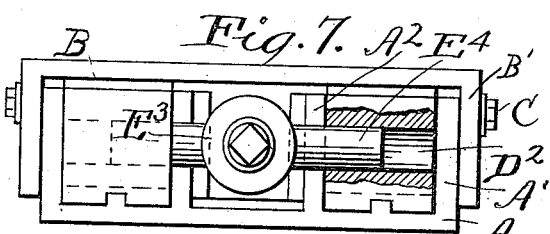
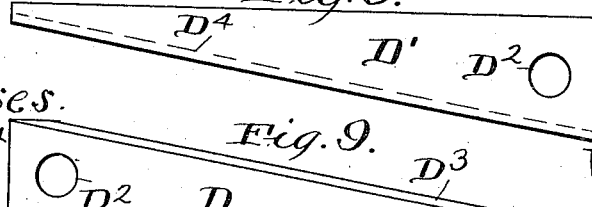
Witnesses.
E. B. Gilchrist
H. B. Sullivan
Inventor.
Philip Keymer
by
Thurston Woodward
Attys

UNITED STATES PATENT OFFICE.

PHILIP KEYMER, OF CLEVELAND, OHIO.

KEEL-BLOCK.

965,302.

Specification of Letters Patent. Patented July 26, 1910.

Application filed September 3, 1907. Serial No. 391,032.

*To all whom it may concern:*

Be it known that I, PHILIP KEYMER, a citizen of the United States, residing at Cleveland, in the county of Cuyahoga and State of Ohio, have invented a certain new and useful Improvement in Keel-Blocks, of which the following is a full, clear, and exact description.

The object of the present invention is to provide a keel block of novel form and construction, adapted to be readily placed in or removed from operative position, and having such characteristics as render it capable of being used an unlimited number of times without the necessity of injuring or replacing any part.

Figure 1:
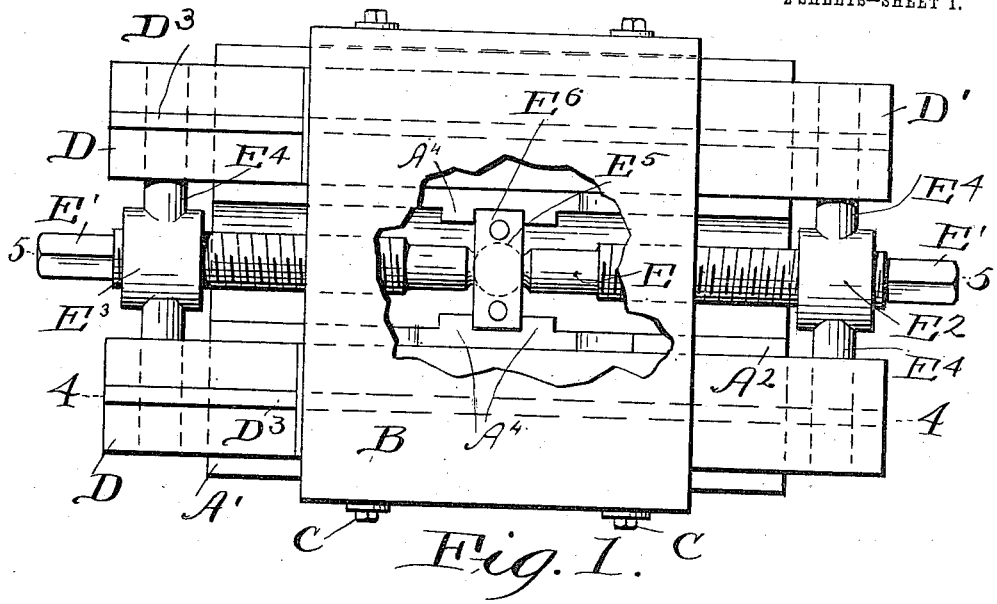
Figure 2:
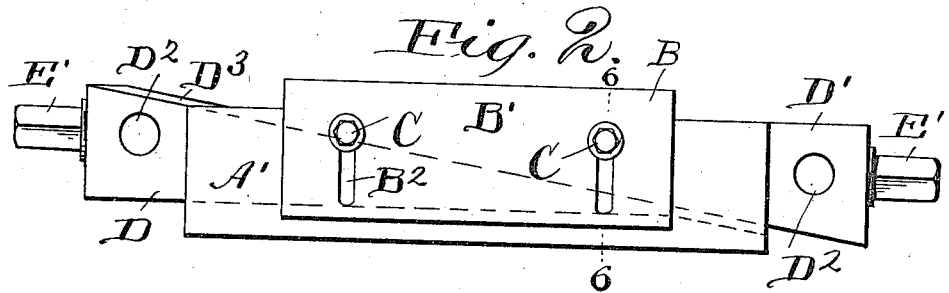
Figure 3:
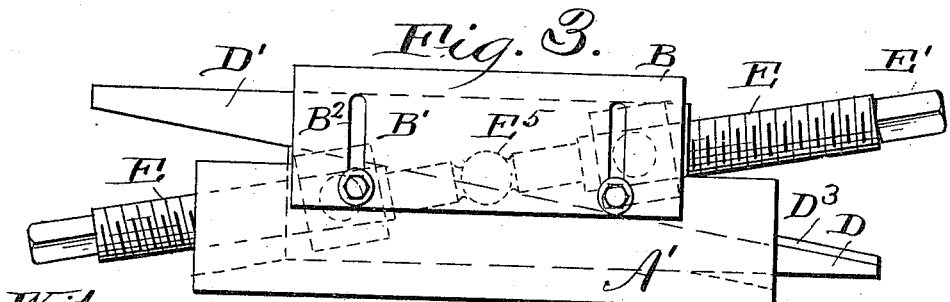

As is well known to those familiar with shipbuilding, hundreds of keel blocks of the ordinary wooden wedge construction are used beneath the keel of each ship, which blocks, after becoming wedged into their proper positions, are ordinarily removable only by being chopped to pieces. This is quite wasteful of material, and additionally consumes an undue amount of time. It is for the purpose of remedying this loss of material and time that I have devised and produced the structure herein described in the specification below, reference being had to the accompanying drawings; in which:

Figure 1 is a top plan view, partly broken away, of my new form of block. Fig. 2 is a side elevation showing the block with the parts in the condition in which they are before being placed under the keel. Fig. 3 is a side elevation illustrating the position of the parts after the block has been raised to support the keel. Fig. 4 is a vertical, longitudinal section along the line 4—4 of Fig. 1, the parts being shown in the same position as that which they occupy in Fig. 2. Fig. 5 is a similar section along the line 5—5 of Fig. 1. Fig. 6 is a transverse section along the line 6—6 of Fig. 2. Fig. 7 is an end view, partly broken away, looking from the right hand of Fig. 2. Fig. 8 is a side elevation of one of the upper sliding wedges, the depth of the groove in the lower face thereof being indicated in dotted lines. Fig. 9 is a side elevation of a lower wedge showing the tongue which fits into the groove on the lower face of the upper wedge. Fig. 10 is a top plan of a lower wedge, and Fig. 11 is a bottom plan of an upper wedge.

My keel block in the form shown in the above described figures, comprises a base A having upwardly extending sides A'. Placed over this base is a top plate B having depending wings B' embracing the sides of the base. This top plate is designed to bear against the load and for that purpose is freely, vertically movable, being guided in its movement by cap screws C secured into the sides of the base, guiding slots $B^2$ being provided in the wings of the top plate through which the stems of these cap screws pass.

For the purpose of lifting the top plate, I employ two pairs of sliding wedges D D' sliding and guided in ways on the base, there being two of these slideways formed by the sides A' of the base and the two interior partitions $A^2$ $A^2$. The central space between these two interior partitions $A^2$ $A^2$ affords room for the location of a screw rod E, having right hand threads at one end, and left hand threads at the opposite end. This double threaded screw rod is preferably provided with squared ends E' for receiving a crank arm so that it may be rotated for the purpose of securing the advancement or retraction of two nuts $E^2$, $E^3$, which are mounted on the threaded portions. Each of these nuts is provided with cylindrical lugs $E^4$ projecting from diametrically opposite sides adapted to fit into holes $D^2$ at the outer end of each of the sliding wedges D D'. The lugs $E^4$ projecting from one nut $E^3$, for example, will be fitted into the openings $D^2$ of the lower wedges D, while the lugs $E^4$ of the nut $E^2$ at the other end of the screw will be fitted into the holes $D^2$ at the ends of the two upper wedge members D'.

At the center of the screw rod, I provide a ball $E^5$ fitted into a guiding and retaining block $E^6$, which is made in sections for the purpose of assembling. The opening in this block is of proper size to permit the screw rod to tilt to such angle as may be necessary in operation, while at the same time properly retaining it in fixed position so far as endwise movement is concerned, the block itself being held between vertical guides $A^4$, which permit of vertical movement on the part of the block $E^6$, but which do not allow movement in either endwise direction.

It is to be noted that the interior partitions $A^2$ are each cut away toward their ends, so as to permit the travel of the nuts $E^2$ $E^3$ inward toward the center, and in each pair of wedge blocks, one of the members, for example D, is provided with a tongue $D^3$, while the other member D' is provided with a corresponding groove $D^4$ in order to maintain the members in proper relative position.

It will be seen from the above description that upon the rotation of the screw rod in either direction, the two nuts, located on the oppositely inclined screw threads, will be caused each to move inwardly, or each to move outwardly according to the direction of the rotation of the screw rod. According to the movement of the nuts, the wedge blocks will be also moved inwardly or outwardly, and if moved inwardly will, of course, cause the lifting of the top plate up to bear against the load.

It will be seen that as the wedge members move from the position shown in Fig. 2, to that shown in Fig. 3, the relative elevation of the transverse horizontal axes of the two nuts will be changed, the absolute elevation of the nut $E^3$ connected with the lower wedge members D remaining the same in the construction shown, while that of the nut $E^2$ connected with the upper wedge members D' will constantly increase. This naturally results in a lifting of the center of the screw rod at its ball bearing in the central retaining block $E^6$, but inasmuch as this block is permitted to slide freely upward, no binding of the parts occurs.

It will be obvious to any engineer, that with the multiplication of power thus obtained through the use of the screw thread and the sliding wedges, it will be comparatively easy for any one operating a crank fitted to the end of the screw rod, to exert an upward lifting thrust on the top plate amounting to several tons.

It will further be plain to any one, that when it is desired to move the keel block from beneath the keel, it will only be necessary to give a reverse movement to the screw rod so as to lower the block slightly, whereupon it can be readily removed without the destruction of a single part.

The enormous advantage of this construction over such blocks as those which must be partially or wholly destroyed, or for which a considerable amount of time must be taken in their removal, will be plain to those skilled in the art without further description.

Having thus described my invention, I claim:

1. A keel block comprising a base having a guide way, a pair of wedge members in said guide way, a screw rod having right and left handed screw threads on its opposite ends, nuts on said screw threads, said nuts connected to said wedge members, and a vertically movable guide block in which said screw rod is mounted and retained against endwise movement.

2. A keel block comprising a pair of wedge members, a screw rod having right and left handed threads thereon, nuts on said threads, one of said nuts connected to a lower wedge member, another of said nuts connected with an upper wedge member, the connections of said nuts and wedge members permitting a change in the inclination of said screw rod.

3. A keel block comprising a base, a guide way therein, a pair of wedge members in said guide way, a top plate vertically movable relative to the base, a screw rod having right and left handed screw threads which engage corresponding threads connected with the lower and upper wedge members.

4. A keel block comprising a base, guide ways therein, a pair of wedge members in each of said guide ways, a screw rod having right and left handed screw threads, and nuts mounted on said threads, one nut secured to the lower wedge members, another nut secured to the upper wedge members.

5. A keel block comprising a base, wedge members thereon, at least one of said wedge members being movable, to which last named member a screw rod is connected by means of a non-rotatable nut mounted on said screw rod, and a top plate connected to the base and adapted to move vertically only away from it mounted above said wedge member, said screw being rotatably connected to the base and held against endwise movement thereby.

6. A keel block comprising a base, a top plate adapted to move in a vertical direction, two wedge members therebeneath, a screw rod connected in suitable manner with one of said members, and a non-rotatable nut on said screw rod connected with the other of said wedge members, said screw being rotatably connected to the base and held against endwise movement thereby.

7. A keel block comprising a base, a pair of wedge members, a screw rod having right and left handed screw threads engaging threads connected with said wedge members, and a top plate vertically movable relative to and guided by said base.

8. A keel block comprising a base, two pairs of wedge members, a screw rod located between said pairs of wedge members, right and left handed screw threads on opposite ends of said rod and nuts fitted thereon, said nuts connected respectively with the upper and lower members of each pair of wedge members, and a top plate over said wedge members.

In testimony whereof, I hereunto affix my signature in the presence of two witnesses.

PHILIP KEYMER.

Witnesses:
E. B. GILCHRIST,
H. R. SULLIVAN.